No. 769,986.                                                    Patented September 13, 1904.

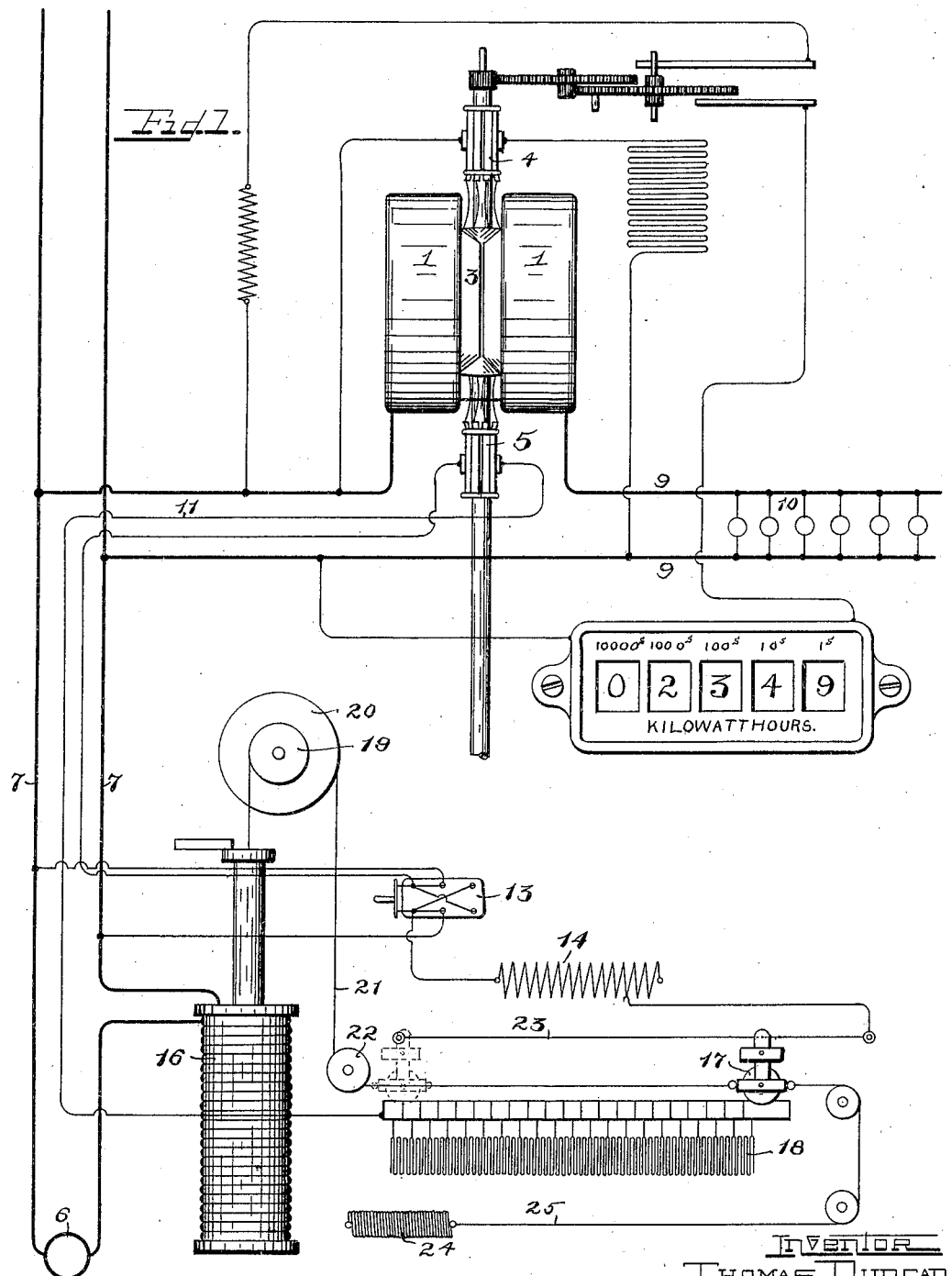

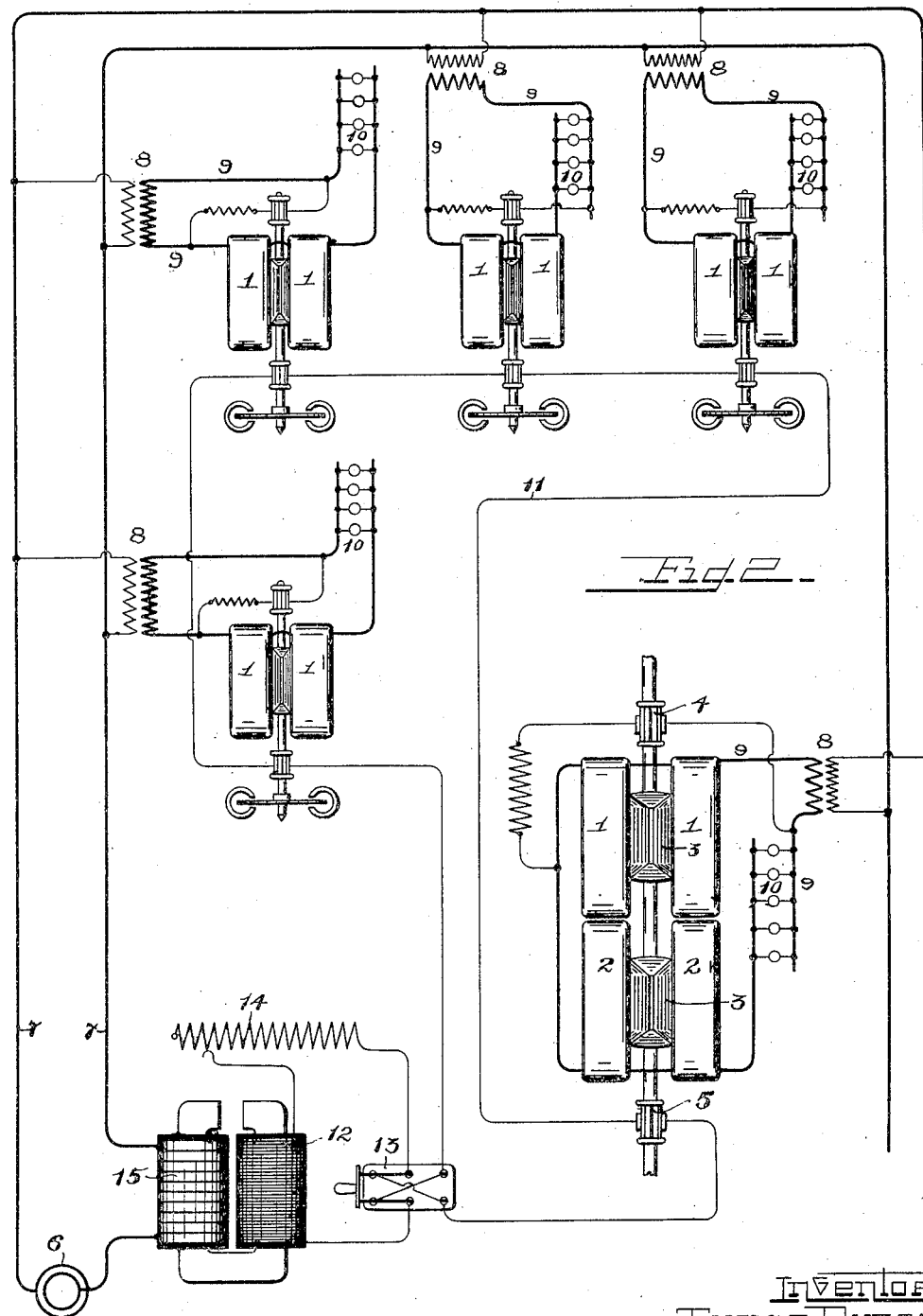

UNITED STATES PATENT OFFICE.

THOMAS DUNCAN, OF CHICAGO, ILLINOIS.

ELECTRIC METER.

SPECIFICATION forming part of Letters Patent No. 769,986, dated September 13, 1904.

Application filed July 18, 1901. Serial No. 68,752. (No model.)

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to multirate meters, and has for its object the provision of improved apparatus whereby meters may be run at a normal rate, overrate, or underrate.

In the metering of energy or loads in working circuits it is desirable to provide for two or three different rates of operation of the counting mechanism of the meters per unit of load or energy, one rate of operation—the normal—continuing, say, from six to six in the day-time, another rate of operation, the overrate—that is, above the normal. The reason for this is that the central station is usually taxed to its utmost between the hours of six and twelve at night, for which consequently the consumer who uses power during this time should be charged at a rate in proportion to the cost of the central-station installation which is equipped for this maximum output required at no other time. Between twelve and six in the morning the station is taxed the least, during which time a minimum amount of apparatus is required, calling for the minimum return upon the investment. Between the hours of six to six in the day-time the central station is not taxed to its limit, nor is it taxed at the minimum, so that the consumer should be charged a rate warranted by the installation necessary to supply the normal demand. Obviously these periods during which the normal, maximum, and minimum rates of operation for measuring mechanisms per unit of energy or load are required may vary with the season and local conditions.

In practicing my invention I employ a secondary pressure-circuit, upon which secondary pressure may be impressed in any suitable way from a suitable source, preferably the same source that supplies the main impressed pressure. This supplemental pressure-circuit may either serve to increase the torque when the meter is to be operated at an overrate, or this secondary pressure may serve as a counter electromotive force in the circuit including the pressure-winding of the meter when the meter is to run at an underrate, the means for controlling the application of the supplemental pressure to the meter also serving to open the supplemental pressure-circuit to permit the meter to run at a normal rate.

In my present invention I provide meters each having an auxiliary winding which is included in circuit in the supplemental pressure-circuit when the meter is to operate at an under or an over rate, this supplemental winding being excluded from the secondary pressure-circuit when the meter is to operate at a normal rate. The supplemental meter-winding is preferably mounted upon a shaft, which also supports a main meter-winding, these windings being preferably in the form of commutated armatures. The armature-windings may be subject to a field produced by a common field-winding, or the armature-windings may be separated, each having its own field-winding.

Another feature of my present invention consists in the provision of a rheostat whose resistance is adapted to be included in the secondary pressure-circuit and excluded therefrom by the operation of a solenoid whose core is preferably connected by means of a cord traveling over suitable pulleys to a traveling trolley roller or wheel having rolling contact with terminals of the rheostat, the trolley also having moving contact with an elongated terminal of the secondary circuit.

I preferably include the supplemental windings of the meters in a common secondary or supplemental pressure-circuit, which is preferably subject to the main impressed pressure modified by suitable resistance to produce the requisite secondary pressure, or the secondary pressure is obtained from the secondary of a transformer where alternating-current systems of electrical distribution are employed, the primary of the transformer being preferably included in series in a transmission-main. If it is desired to have the meters operate at two rates, the normal rate of operation may be secured by opening the secondary pressure-circuit at the generating-station, whereby all of the pressure-windings are excluded from the secondary pressure-circuit, or this pressure-circuit may be closed at some place, whereby the pressure-winding is subjected to the secondary electromotive force to modify the rate of the meter. If it is desired to have the meter operate at three rates, a pole-changing switch may be employed, which causes the secondary pressure to produce an additive electromotive force to increase the torque, and thereby operate the meter at an overrate, or the switch is manipulated to cause the secondary pressure to produce a counter electromotive force, whereby the torque is diminished and the meter run at an underrate.

In addition to controlling the application and direction of the supplemental or secondary electromotive force the degree thereof is automatically regulated according to the load. A solenoid may be employed for cutting resistance out of and into the secondary circuit to increase and decrease the pressure therein as the current through the system increases and decreases, or this result is accomplished by the change of induction in the transformer that is automatically varied according to the load.

I will explain my invention more fully by reference to the accompanying drawings, in which—

Figure 1 diagrammatically illustrates a system of electrical distribution, a meter being associated therewith in accordance with my invention. Fig. 2 illustrates a system of alternating-current distribution in accordance with the invention.

Like parts are indicated by similar characters of reference in both views.

In the figures I have illustrated commutated motor-meters; but it is obvious that other forms of meters may be employed in connection with the invention.

I will first describe the meters and thereafter their association with the systems of distribution.

In Fig. 2 there is illustrated, somewhat in detail, one form of meter having two sets of field-windings divided into coils 1 1 and 2 2 and two sets of pressure-windings, in this instance in the form of armature-windings 3 3, that are separated physically, each being subject to the field produced by a field-winding, there being thus what may be termed to be two "coöperating" motor members of the meter. These armature-windings are mounted upon a common shaft, upon which are located commutators 4 and 5, by which current may be conveyed to the armature-windings, the commutator 4 serving to subject the upper armature-winding to the main impressed pressure, while the commutator 5 serves to include the lower armature-winding in the secondary pressure-circuit. When the electromotive force in the secondary circuit is impressed upon the lower armature in one direction to aid or increase the torque of the meter, it may be said that the meter then has an additive electromotive force impressed thereupon, when the direction of the secondary pressure is reversed to reduce the torque of the meter it may be said that the meter has a counter electromotive force impressed thereupon, and when the secondary circuit is totally open the upper armature-winding 3 is subject to pressure from the main circuit, the lower armature-winding being then inactive, in which condition there is no adjusting secondary electromotive force impressed upon the meter, which thereupon is adapted to operate at a normal rate. Where it is desired, the two sets of armature-windings may be collocated and a common set of field-windings 1 1 may be coöperatively related with both, whereby one pair of field-coils may be dispensed with. This arrangement is illustrated in Fig. 2 and in Fig. 1.

Referring first more particularly to Fig. 2, I have therein shown a system of alternating-current distribution employing an alternating-current generator 6, supplying current to transmission-mains 7 7, leading current to the district of consumption, where I have indicated a transformer 8 whose primary is in bridge of the mains and whose secondary conveys current over distributing-mains 9 9 to the translating devices 10, the field-winding of each meter being included in one of the mains 9.

To secure a modified torque, a round circuit 11 is provided that may include in series therewith the supplemental pressure-windings of a plurality of meters. This round circuit is subject to a modifying secondary electromotive force when it is desired to depart from the normal rate.

When alternating-current systems of electrical distribution are involved, I prefer to employ the means illustrated in Fig. 2, where the secondary pressure is generated in the secondary coil 12 of a transformer whose primary 15 is connected in series with one of the mains 7. The core of the transformer is provided with adjusting reluctance, preferably in the form of a complete air-gap.

The system shown in Fig. 2 is organized to produce three rates of rotation of the meter per unit of load or energy, for which purpose a switch 13 is associated with the secondary pressure-circuit, which switch when thrown to the right, for example, will cause the supplemental windings to be subject to a secondary pressure to produce an increased torque per unit of load or energy or when thrown to the left will cause the secondary pressure through the supplemental winding to be reversed to decrease the torque of the meter. When the switch 13 is in a neutral position, the secondary circuit is open, when the meter will operate at a normal rate. The switch 13 thus constitutes a pole-changing switch. An adjusting device, preferably in the form of a resistance 14, is included in the supplemental secondary pressure-circuit and adjusts the resistance thereof to compensate for the number of meters in the said secondary circuit. A certain percentage of overload may be also provided for by the adjustable resistance 14. The amount of pressure in the secondary circuit 11 is automatically varied by reason of the varying ratio of transformation between the primary and secondary of the transformer occurring upon variation of load. If the full load (peak load) is, say, one thousand amperes, the turns of the primary 15 may be made to give the desired per cent. of increase in rate at full load, so that as the load gradually increases, say, from six o'clock up to the highest peak load the rate is automatically increasing with the load, as is required in an ideal multirate metering system. As the load gradually decreases so does the over-normal rate.

The arrangement illustrated in Fig. 1 is particularly applicable to direct-current systems, and parts similar to those illustrated in Fig. 2 are given similar characters of reference.

The system illustrated in Fig. 1 is similar in general characteristics to that illustrated in Fig. 2, and I shall therefore not describe it in detail, but simply point out the distinctions between this system and that of Fig. 2.

In Fig. 1 is illustrated a solenoid 16 whose helix is in series in a transmission-main, the core of the solenoid actuating a roller contact 17, that constitutes one terminal of the secondary pressure-circuit, the other end of the pressure-circuit terminating in a resistance 18, which is excluded from circuit upon an increase in the load upon the system to thereby increase the secondary pressure and which is included in circuit when the load is decreased, thereby reducing the secondary electromotive force, the arrangement being such that when the load upon the system is below a predetermined normal maximum the entire resistance is cut out of circuit, as shown in dotted lines in Fig. 1, the meters thereupon being relieved of the secondary pressure, whereby they may operate at normal rates of speed. The pole-changing switch (illustrated in Fig. 1) is designed for controlling the direction of application of the secondary pressure to cause the same to act as an additive electromotive force when the rate of operation is to be increased and as a counter electromotive force when the rate of operation is to be diminished.

The controlling device that I have illustrated in Fig. 1 also includes coaxial pulleys 19 and 20, the latter of larger size, the cord passing around the former being secured to the core of the solenoid, while the latter is connected with the trolley 17 by means of the cord 21 passing over a guiding-pulley 22, whereby as the core of the solenoid is drawn within the helix thereof the trolley 17 is moved toward the left to gradually cut out the resistance 18, and thereby increase the effective torque of the meter. The trolley, preferably through the medium of its frame, is adapted for sliding contact with an elongated conductor 23, acting also as a guide, whereby this trolley constitutes a traveling terminal of the secondary pressure-circuit. While the core of the solenoid is adapted to effect the travel of the trolley toward the left, I prefer to employ a spring 24, connected with the trolley by means of a cord 25 passing over pulleys and connected with the other side of the frame of the trolley, so that as the energization of the solenoid-helix decreases the resistance 18 is gradually introduced into the secondary pressure-circuit, thereby reducing the effective torque of the meter. The form of meter illustrated in Fig. 1 may be employed or other forms, if desirable.

The counting-train and recording mechanism operated by the meter form no part of my present invention. Any suitable integrating counting mechanism may be employed, and I do not, therefore, deem an elucidation of such well-known mechanism to be essential.

While I have herein shown and particularly described the preferred embodiment of my invention, it is obvious that changes may be made without departing from the spirit thereof, and I do not, therefore, wish to be limited to the precise disclosures herein set forth; but,

Having thus described my invention, I claim as new and desire to secure by Letters Patent—

1. The combination with a meter, of a supplemental winding therefor, and a supplemental pressure-circuit for inclusion with the supplemental winding to modify the normal torque of the meter, substantially as described.

2. The combination with a meter, of a supplemental winding therefor, a supplemental pressure-circuit for inclusion with the supplemental winding to modify the normal torque of the meter, and a pole-changing switch for changing the direction of the current in the secondary pressure-circuit to cause the meter to run at an overrate or an underrate, substantially as described.

3. The combination with a meter, of a supplemental pressure-winding therefor, and a supplemental pressure-circuit for inclusion with the supplemental winding to modify the normal torque of the meter, substantially as described.

4. The combination with a meter, of a supplemental pressure-winding therefor, a supplemental pressure-circuit for inclusion with the supplemental winding to modify the normal torque of the meter, and a pole-changing switch for changing the direction of the current in the secondary pressure-circuit to cause the meter to run at an overrate or an underrate, substantially as described.

5. The combination with a meter, of a supplemental pressure-winding therefor, and a supplemental pressure-circuit for inclusion with the supplemental winding to modify the normal torque of the meter, the main and supplemental pressure-windings being in the form of commutated armature-windings mounted upon a common shaft, substantially as described.

6. The combination with a meter, of a supplemental pressure-winding therefor, a supplemental pressure-circuit for inclusion with the supplemental winding to modify the normal torque of the meter, and a pole-changing switch for changing the direction of the current in the secondary pressure-circuit to cause the meter to run at an overrate or an underrate, the main and supplemental pressure-windings being in the form of commutated armature-windings mounted upon a common shaft, substantially as described.

7. The combination with a meter, of a supplemental pressure-winding therefor, and a supplemental pressure-circuit for inclusion with the supplemental winding to modify the normal torque of the meter, the main and supplemental pressure-windings being in the form of commutated armature-windings mounted upon a common shaft, the said pressure-windings being collocated and subject to the field produced by a common field-winding, substantially as described.

8. The combination with a meter, of a supplemental pressure-winding therefor, a supplemental pressure-circuit for inclusion with the supplemental winding to modify the normal torque of the meter, and a pole-changing switch for changing the direction of the current in the secondary pressure-circuit to cause the meter to run at an overrate or an underrate, the main and supplemental pressure-windings being in the form of commutated armature-windings mounted upon a common shaft, the said pressure-windings being collocated and subject to the field produced by a common field-winding, substantially as described.

9. The combination with a system of electrical distribution, of a meter receiving current therefrom, a supplemental or secondary pressure-circuit, a resistance included therein, a solenoid included in the main circuit, a trolley-wheel or sliding contact having engagement with terminals of the resistance or rheostat, a cord connecting the solenoid-core with the sliding trolley, pulleys for guiding the cord in its travel, and means for effecting the reverse travel of the trolley, substantially as described.

10. The combination with a system of electrical distribution, of a meter receiving current therefrom, a supplemental or secondary pressure-circuit, a resistance included therein, a solenoid included in the main circuit, a trolley-wheel or sliding contact having engagement with terminals of the resistance or rheostat, a cord connecting the solenoid-core with the sliding trolley, pulleys for guiding the cord in its travel, and a cord and spring connected with the trolley for effecting its reverse travel, substantially as described.

11. The combination with a meter, of a supplemental winding therefor, and a supplemental circuit for inclusion with the supplemental winding to modify the normal torque of the meter, substantially as described.

12. The combination with a meter, of a supplemental pressure-winding therefor, and a supplemental circuit for inclusion with the supplemental pressure-winding to modify the normal torque of the meter, substantially as described.

In witness whereof I hereunto subscribe my name this 3d day of June, A. D. 1901.

THOMAS DUNCAN.

Witnesses:
  GEORGE L. CRAGG,
  HARVEY L. HANSON.